(12) United States Patent
Huxham (10) Patent No.: US 9,634,988 B2
(45) Date of Patent: Apr. 25, 2017

(54) EXPANSION DEVICE PLACEMENT APPARATUS

(75) Inventor: Horatio Nelson Huxham, Kenridge (ZA)

(73) Assignee: Visa International Service Association, San Francisco, CA (US)

(*) Notice: Subject to any disclaimer, the term of this patent is extended or adjusted under 35 U.S.C. 154(b) by 514 days.

(21) Appl. No.: 14/233,654

(22) PCT Filed: Jul. 20, 2012

(86) PCT No.: PCT/US2012/047675
§ 371 (c)(1),
(2), (4) Date: Jun. 18, 2014

(87) PCT Pub. No.: WO2013/013184
PCT Pub. Date: Jan. 24, 2013

(65) Prior Publication Data
US 2014/0290056 A1    Oct. 2, 2014

Related U.S. Application Data

(60) Provisional application No. 61/510,023, filed on Jul. 20, 2011.

(51) Int. Cl.
*B32B 37/00*        (2006.01)
*H04L 29/06*        (2006.01)
(Continued)

(52) U.S. Cl.
CPC .......... *H04L 63/02* (2013.01); *G06Q 20/027* (2013.01); *G06Q 20/325* (2013.01); *G06Q 20/3223* (2013.01); *G06Q 20/3226* (2013.01); *G06Q 20/3229* (2013.01); *G06Q 20/3278* (2013.01); *G06Q 20/382* (2013.01);
(Continued)

(58) Field of Classification Search
CPC ...... G06K 7/00; G06K 7/0013; G06K 7/0056; G06Q 20/027; G06Q 20/3228; G06Q 20/325; G06Q 20/3278; G06Q 20/382; G06Q 20/3823; G06Q 20/3223; G06Q 20/3229; H05K 3/321; H04L 63/02; H04L 63/0281; H04L 63/0464; H04L 63/08; H04L 63/10; H04L 2463/102; H04W 12/02; H04W 12/08; Y10T 29/4913; Y10T 29/53174
See application file for complete search history.

(56) References Cited

U.S. PATENT DOCUMENTS 4,959,008 A    9/1990  Wasulko
5,504,988 A    4/1996  Avery et al.
(Continued)

OTHER PUBLICATIONS

International Search Report and Written Opinion mailed on Jan. 17, 2013 for PCT Patent Application No. PCT/US20112/047675, 14 pages.

*Primary Examiner* — Carl Arbes
(74) *Attorney, Agent, or Firm* — Kilpatrick Townsend & Stockton LLP (57) ABSTRACT

An apparatus that facilitates the accurate and uncomplicated placement of an adhesive circuit structure onto an integrated circuit card is described. The apparatus is configured to hold the adhesive circuit structure and an integrated circuit card such that the two components can be aligned for proper placement.

16 Claims, 5 Drawing Sheets (51) Int. Cl.
  *H04W 12/02* (2009.01)
  *H04W 12/08* (2009.01)
  *G06Q 20/02* (2012.01)
  *G06Q 20/32* (2012.01)
  *G06Q 20/38* (2012.01)
  *H05K 3/32* (2006.01)

(52) U.S. Cl.
  CPC ..... *G06Q 20/3823* (2013.01); *H04L 63/0464* (2013.01); *H04L 63/08* (2013.01); *H04L 63/10* (2013.01); *H04W 12/02* (2013.01); *H04W 12/08* (2013.01); *H05K 3/321* (2013.01); *H04L 63/0281* (2013.01); *H04L 2463/102* (2013.01); *Y10T 29/4913* (2015.01); *Y10T 29/53174* (2015.01)

(56) References Cited

U.S. PATENT DOCUMENTS

| | | | |
|---|---|---|---|
| 5,708,419 A | 1/1998 | Isaacson et al. | |
| 5,712,766 A | 1/1998 | Feldman | |
| 6,766,952 B2* | 7/2004 | Luu | G06K 7/0034 235/451 |
| 6,978,940 B2* | 12/2005 | Luu | G06K 7/0034 235/485 |
| 6,991,172 B2* | 1/2006 | Luu | G06K 19/072 235/492 |
| 7,944,703 B2 | 5/2011 | Ni et al. | |

* cited by examiner

EXPANSION DEVICE PLACEMENT APPARATUS

CROSS-REFERENCES TO RELATED APPLICATIONS

This application is a 371 of International Application No. PCT/US2012/047675, filed Jul. 20, 2012, which is a non-provisional of and claims the benefit of the filing date of U.S. Provisional Patent Application No. 61/510,023, filed on Jul. 20, 2011, the contents of which are all herein incorporated by reference.

BACKGROUND

The accurate and proper placement of an adhesive object onto another object can require greater skill than that which can be conducted free hand. When the objects contain microprocessors and electrical components that require precise alignment, the task can be even more daunting. If the two objects are incorrectly affixed or bonded to each other, the objects can be rendered inoperable and/or a replacement may be required. The microprocessors and electrical components on the objects could be damaged either by the inaccurate placement or by attempts to disengage and then reattach the two objects.

One possible solution would be to use sophisticated machinery programmed to accurately bond the two objects together. However, this can also be costly and time-consuming. Consumers would be required to physically send the objects to a facility to conduct the bonding procedure and then wait for the bonded objects to be sent back. In addition, the costs of maintaining such machinery may be cost-prohibitive.

Another possible solution that solves this problem is to send the objects pre-bonded to consumers. However, while this solution may be suitable for new consumers, pre-existing consumers still face the same issues.

Thus, new and enhanced methods of providing for the accurate and proper placement of an adhesive object onto another component that solve the above problems would be desirable.

Embodiments of the invention address the above problems, and other problems, individually and collectively.

BRIEF SUMMARY

Embodiments of the present invention are related to an apparatus and method for accurately affixing an adhesive circuit structure onto an integrated circuit card.

One embodiment of the invention is directed to an apparatus comprising a retaining structure comprising a plurality of retaining elements, the retaining structure cooperatively structured with and configured to receive an integrated circuit card and an adhesive circuit structure. The apparatus further comprises an opening in a retaining element in the plurality of retaining elements, and a cover portion coupled to the retaining structure, wherein the cover portion comprises a protruding portion that faces inwardly with respect to the retaining structure.

Another embodiment of the invention is directed to a method comprising placing an adhesive circuit structure and a protective layer in a retaining structure comprising a retaining element comprising an opening, wherein a portion of the protective layer passes through the opening. The method further comprises providing placing an integrated circuit card in the retaining structure and separating the protective layer from the adhesive circuit structure by withdrawing the protective layer through the opening. The method further comprises applying pressure to the integrated circuit card and the adhesive circuit structure to bond the integrated circuit card and the adhesive circuit structure together.

These and other embodiments of the invention are described in further detail below with reference to the Figures and the Detailed Description.

DETAILED DESCRIPTION

Prior to discussing embodiments of the invention, descriptions of some terms may be helpful in understanding embodiments of the invention.

The term "retaining structure" may refer to a structure configured to house particular elements. For example, the retaining structure can be comprised of a plurality of retaining elements, such as a plurality of walls, a cover portion, and a hinge that allows the retaining structure to receive an integrated circuit card and an adhesive circuit structure. In embodiments of the claimed invention, the retaining structure comprises at least four walls that are configured into the general shape of the perimeter of an integrated circuit card. The retaining structure is thus cooperatively structured with and configured to receive or house an integrated circuit card and an adhesive circuit structure. As used herein, the retaining structure may also be referred to as a placement apparatus.

The term "integrated circuit card" may refer to an object with embedded integrated circuits. Exemplary integrated circuit cards can provide identification, authentication, data storage and application processing. Examples of integrated circuit cards can include subscriber identity module (SIM) cards that can be installed and transferred between different mobile devices. The integrated circuit card can also be any other component that allows a mobile device to send and receive communications. SIM cards can store network-specific information that can be used to authenticate and identify subscribers on the network in order to allow a mobile device access to the network. The integrated circuit card can also be other types of user-removable component of a mobile device such as various types of memory card, for example, a secure digital (SD) memory card that can be used in conjunction with the mobile device to send and receive communications.

According to some embodiments, the integrated circuit card that the adhesive circuit structure attaches to is a user-removable integrated circuit card of a mobile device.

Specific examples of mobile devices include cellular or wireless phones, personal digital assistants (PDAs), pagers, portable computing devices such as tablet computers or laptops, smart cards, portable multi-functional devices that can send and receive communications such as portable media players/reader, portable game device, and the like.

The integrated circuit card of a mobile device can come in various form factors. For example, in embodiments in which the integrated circuit card is a SIM card, the integrated circuit card can have a form factor according to a full-sized SIM card or a mini-SIM card as specified in the ISO/IEC 7810 standard, or a micro-SIM card or a nano-SIM card as specified in the ETSI TS 102 221 standard. In other embodiments, for example, in which the integrated circuit card is a SD memory card, the integrated circuit card can have a form factor according to a full-size SD card, a micro-SD card, or a mini-SD card as specified in the SD standard of the Secure Digital Association.

The term "adhesive circuit structure" may refer to an object with embedded circuits and microprocessors, that is comprised of a portion with an adhesive material. In embodiments, the adhesive material enables the adhesive circuit structure to be affixed or bonded to another object or component. In some embodiments, the adhesive circuit structure is a flexible circuit, comprising a hardware security module (or HSM module). In other embodiments, the adhesive circuit structure may be semi-flexible or rigid.

An example of an adhesive circuit structure is a cryptographic expansion device that can be attached to an integrated circuit card of a mobile device to enable the mobile device to perform cryptographic operations on communications sent to and from the mobile device.

The term "protective layer" may refer to a layer of material that is disposed onto another object to protect the object. The protective layer can be used to cover sensitive microprocessors and electrical circuitry from contamination by dust and other airborne particles. It can further be used to protect an adhesive material to prevent premature bondage. In embodiments, the protective layer covers a portion of an adhesive circuit structure containing adhesive material for bonding. In some embodiments, the protective layer completely covers the adhesive circuit structure, while in other embodiments, the protective layer may cover only a portion of the adhesive circuit structure. In embodiments, the protective layer is removably attached to the adhesive circuit structure.

In some embodiments of the invention, the protective layer is comprised of multiple sub-layers including a clear plastic film. In other embodiments, the protective layer may be composed of a material that allows for resistance-free separation of the protective layer from the adhesive circuit structure. The use of a material that allows for resistance-free separation from the adhesive material of the adhesive circuit structure can facilitate easier removal of the protective layer from the adhesive circuit structure, and thus facilitate more accurate bonding of the adhesive material to the integrated circuit card.

In embodiments of the invention, the protective layer may include a release coating, which is a material which adheres well to the plastic film, but has the property of only lightly holding, and therefore easily releasing an adhesive coated face of the adhesive circuit structure. The release coating may be made of any suitable material including a silicone resin to which cross-linkable groups, such as acrylic residues, have been appended. The silicone portion of the composition can act as a release agent, and the acrylic groups act to crosslink the release coating composition together.

The term "protruding portion" may refer to a portion of the retaining structure. In embodiments, the protruding portion is attached to the underside of the cover portion of the retaining apparatus. In embodiments, the dimensions of the protruding portion can vary but not exceed the dimensions of the cover portion of the retaining structure.

I. SYSTEMS

Figure 1:
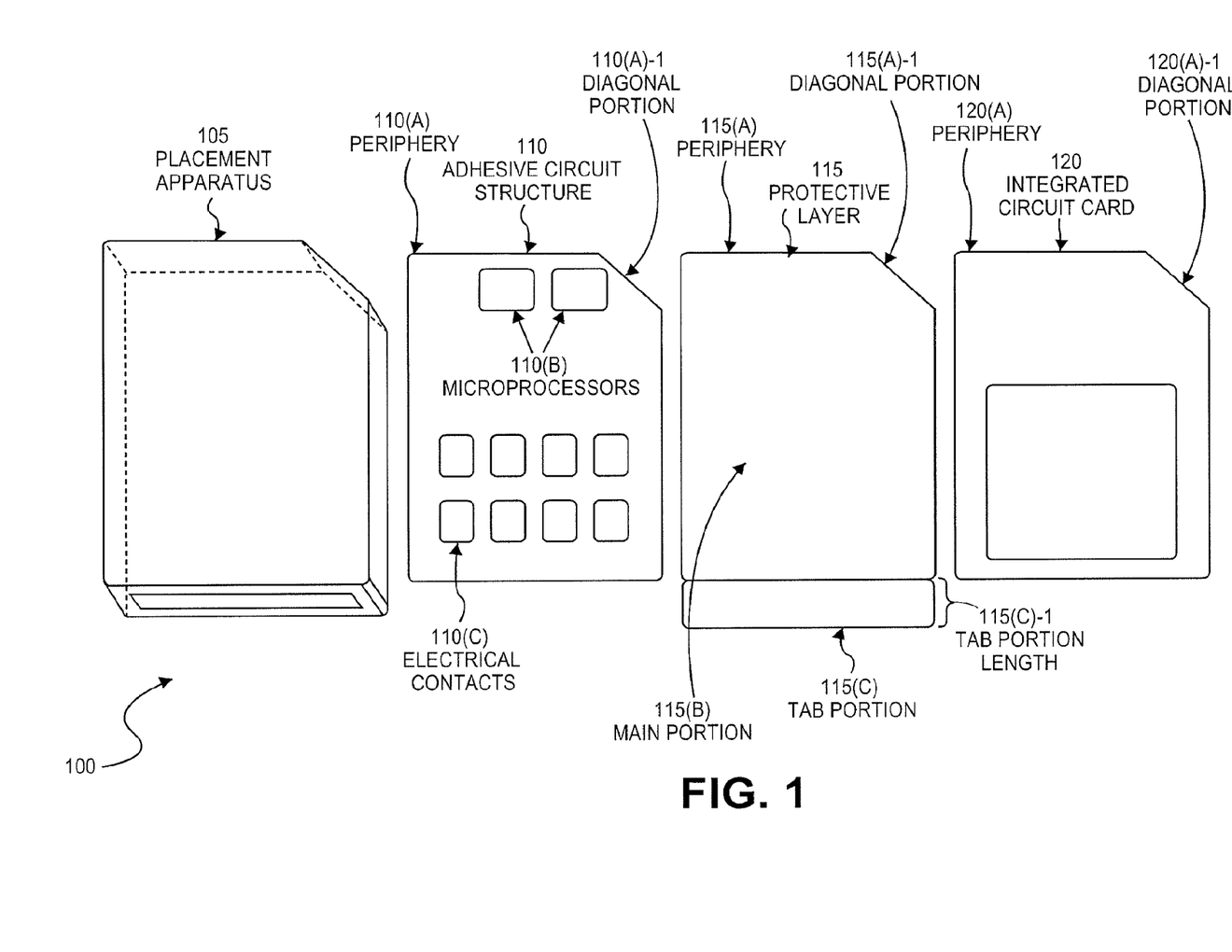
FIG. 1 shows a view of a placement apparatus and the components utilized by the placement apparatus according to an embodiment of the claimed invention.

FIG. 1 depicts an overhead schematic diagram 100 of the components utilized by a placement apparatus according to an embodiment of the claimed invention. The diagram 100 depicts a placement apparatus 105, an adhesive circuit structure 110, a protective layer 115, and an integrated circuit card 120. The adhesive circuit structure 110 can be further comprised of one or more microprocessors 110(B) embedded in the adhesive circuit structure 110. The adhesive circuit structure 110 can be further comprised of one or more electrical contacts 110(C).

The adhesive circuit structure 110 has a periphery 110(A) that includes a diagonal portion 110(A)-1. The protective layer 115 also has a periphery 115(A) that includes a diagonal portion 115(A)-1. The integrated circuit card 120 also has a periphery 120(A) that includes a diagonal portion 120(A)-1.

In embodiments, and as depicted in FIG. 1, the adhesive circuit structure periphery 110(A), the protective layer periphery 115(A), and the integrated circuit card periphery 120(A) are of substantially the same dimensions. The protective layer 115 has a main portion 115(B) and a tab portion 115(C), the tab portion 115(C) having a tab length 115(B)-1 that extends the tab portion 115(C) beyond the dimensions of the protective layer periphery 115(A). The tab portion 115(C) of the protective layer 115 may give the protective layer 115 greater lateral dimensions than the lateral dimensions of the adhesive circuit structure 110 to which the protective layer 115 is initially attached. As shown, the width of the adhesive circuit structure 110 and the width of the protective layer 115 may be substantially equal, while the length of the protective layer 115 may be longer (by the tab portion length 115(C)-1) than the length of the adhesive circuit structure 110. The tab portion length 115(C)-1 may be of any suitable length, including a length greater than about 1, 2, or 5 millimeters.

The substantially same dimensions of the adhesive circuit structure 110, the protective layer 115, and the integrated circuit card 120 allows the two components to be placed securely in the placement apparatus 105. In other embodiments, the protective layer 115 has a dimension different from the dimensions of the adhesive circuit structure 110 and the integrated circuit card 120.

The structure of the placement apparatus 105 is configured such that it can securely hold the adhesive circuit structure 110 and the integrated circuit card 120 within the placement apparatus. Further details regarding the structure of the placement apparatus are discussed with respect to FIGS. 2, 3A and 3B.

Figure 2:
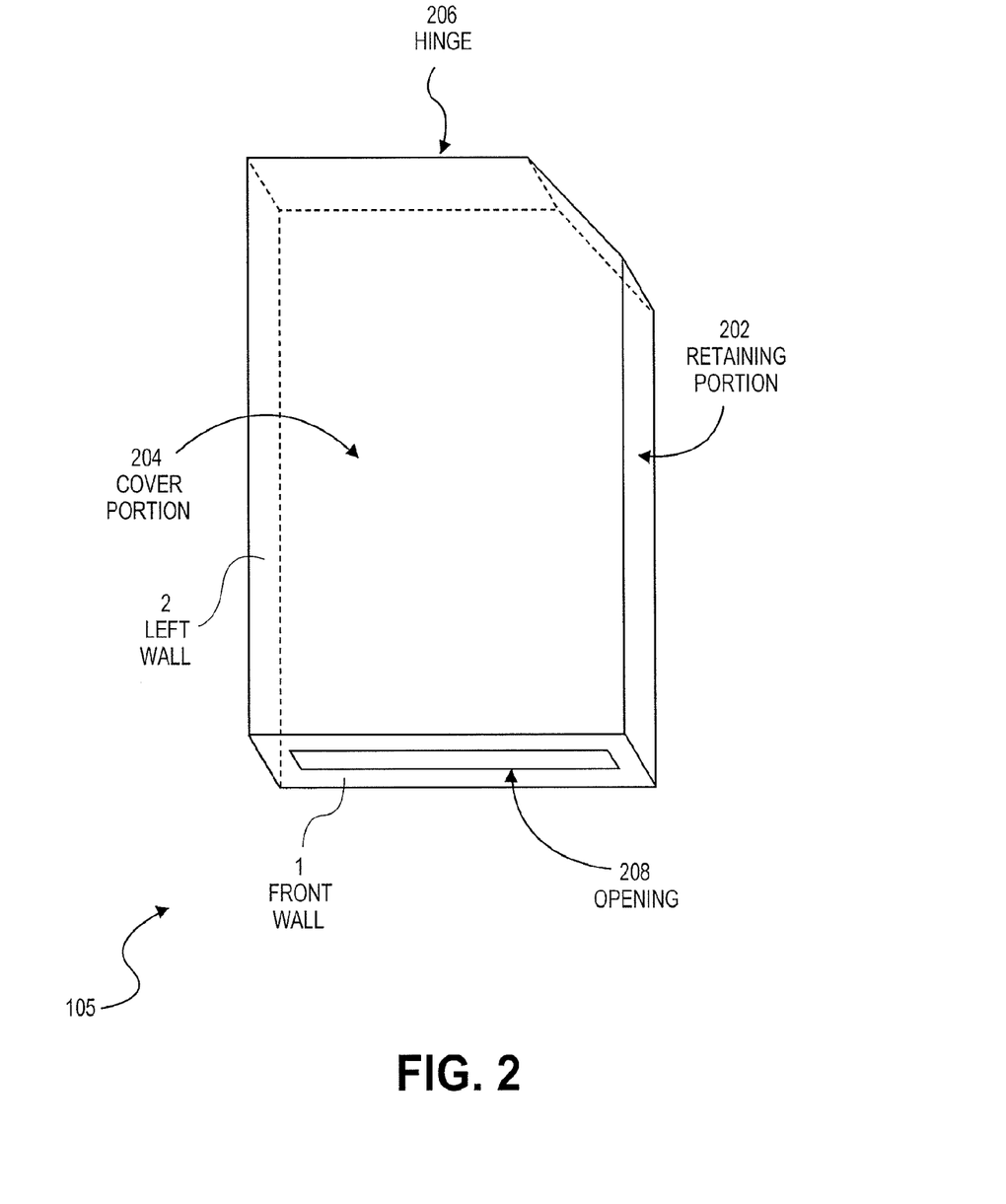
FIG. 2 shows a schematic diagram of a placement apparatus according to an embodiment of the invention.

FIG. 2 depicts a schematic diagram of the placement apparatus 105 with a cover portion 204 in a closed position. The placement apparatus 105 is comprised of a retaining portion 202, the cover portion 204, and a hinge 206. The retaining portion comprises a plurality of retaining elements, including a plurality of walls, and is cooperatively structured with and configured to receive the integrated circuit card 120 and the adhesive circuit structure 110. The retaining portion 202 further comprises an opening 208 in one wall of the retaining portion 202. In embodiments, the opening 208 allows for the tab portion 115(C) of the protective layer 115 to extend beyond the dimensions of the placement apparatus 105. In embodiments, the opening is horizontally elongated. In some embodiments, the opening 208 is located in a front wall 1 of the retaining portion 202. In other embodiments, the opening 208 can be located in any one of the plurality of walls comprising the retaining portion 202. The opening 208 in the retaining portion 202 allows for the tab portion 115(C) of the protective layer 215 to protrude through the opening 208.

Figure 3A:
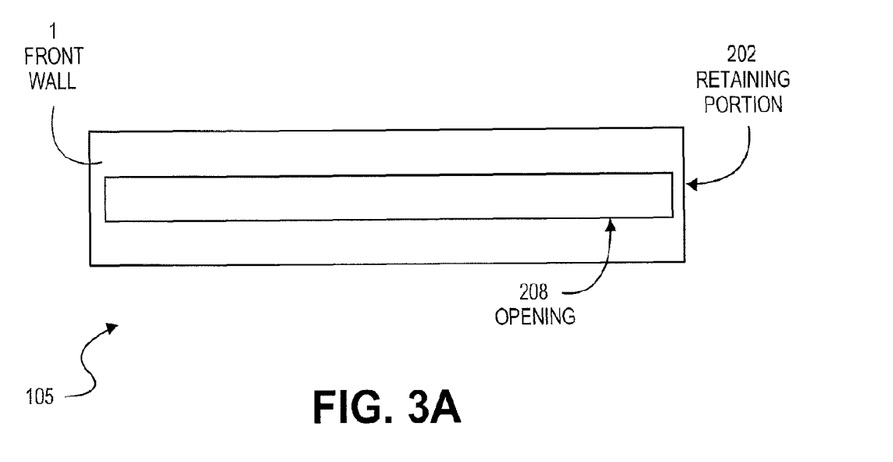
FIGS. 3A and 3B show cross-sectional schematic diagrams of a placement apparatus according to an embodiment of the invention.

FIG. 3A depicts a forward view of the placement apparatus 105 with the cover portion 204 in a closed position, showing the opening 208 disposed in the front wall 1 of the retaining portion 202 as shown in FIG. 2. As noted above, in other embodiments, the opening 208 can be disposed in other walls of the retaining portion 202 besides the front wall 1.

Figure 3B:
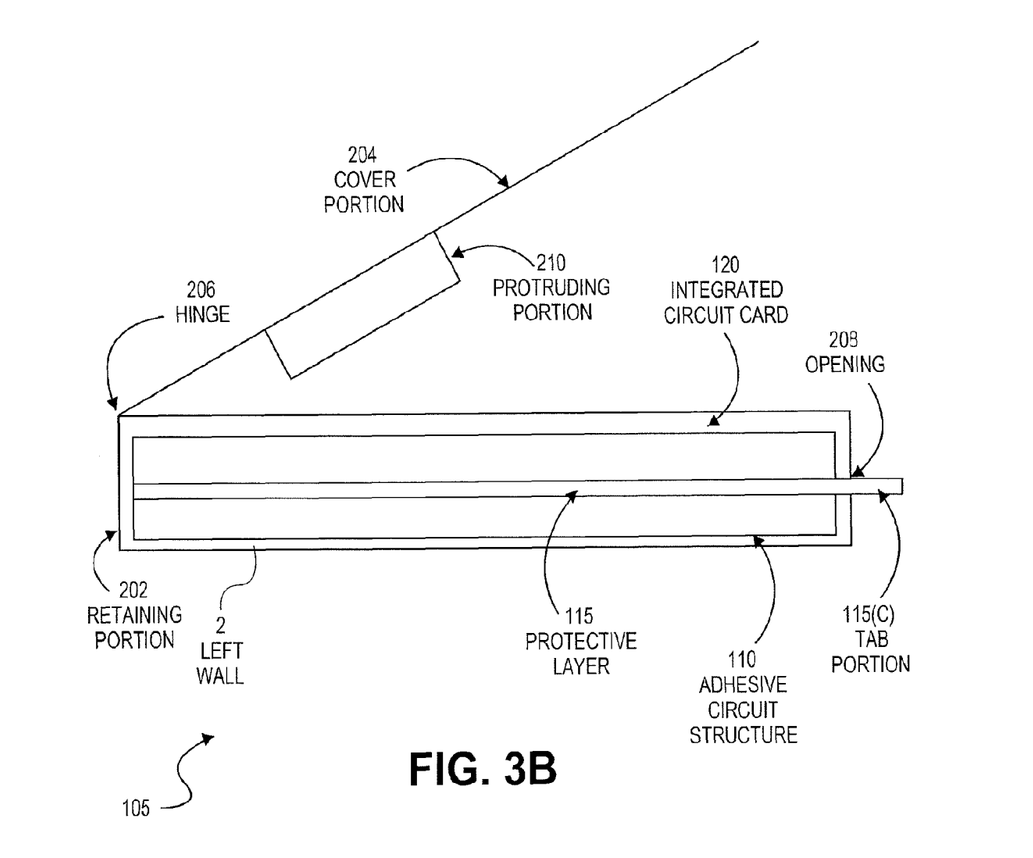

FIG. 3B depicts a cross-sectional side view of the placement apparatus 105 with the cover portion 204 in an open position, from the perspective of the left wall 2 of the retaining portion 202 as shown in FIG. 2. The cross-sectional side view of the placement apparatus 105 shows the adhesive circuit structure 110, the protective layer 115, and the integrated circuit card 120 disposed in the retaining portion 202. As depicted, the adhesive circuit structure 110 is placed in the bottom of the retaining portion 202 with the protective layer 115 adhesively attached to the adhesive circuit structure 110. The integrated circuit card 120 is placed on top of the adhesive circuit structure 110 and the protective layer 115. In other embodiments, the integrated circuit card 120 can be placed in the bottom of the retaining portion 202 with the adhesive circuit structure 110 placed on top of the integrated circuit card 120.

FIG. 3B further depicts the tab portion 120(C) of the protective layer 120 extending beyond the dimensions of the placement apparatus 105. The tab portion 120(C) is extended through the opening 208 located in the front wall 1 of the retaining portion 202.

A protruding portion 210 is also depicted, attached to the underside of the cover portion 204. The protruding portion 210 faces inwardly with respect to the retaining portion 202. The protruding portion 210 shown in FIG. 3B is an example of the size and dimensions of the protruding portion 210. In other embodiments, the dimensions of the protruding portion 210 can be larger or smaller than that depicted in FIG. 3B, but not to exceed the lateral dimensions of the cover portion 204. The protruding portion 210 can be a solid block of material (e.g., plastic) so that the surface thereof is continuous on the bottom.

The hinge 206 is a movable element that couples the cover portion 204 of the placement apparatus 105 to the retaining portion 202 of the placement apparatus 105. The hinge 206 is operable to allow the cover portion 204 to pivot between an open position and a closed position.

Figure 4:
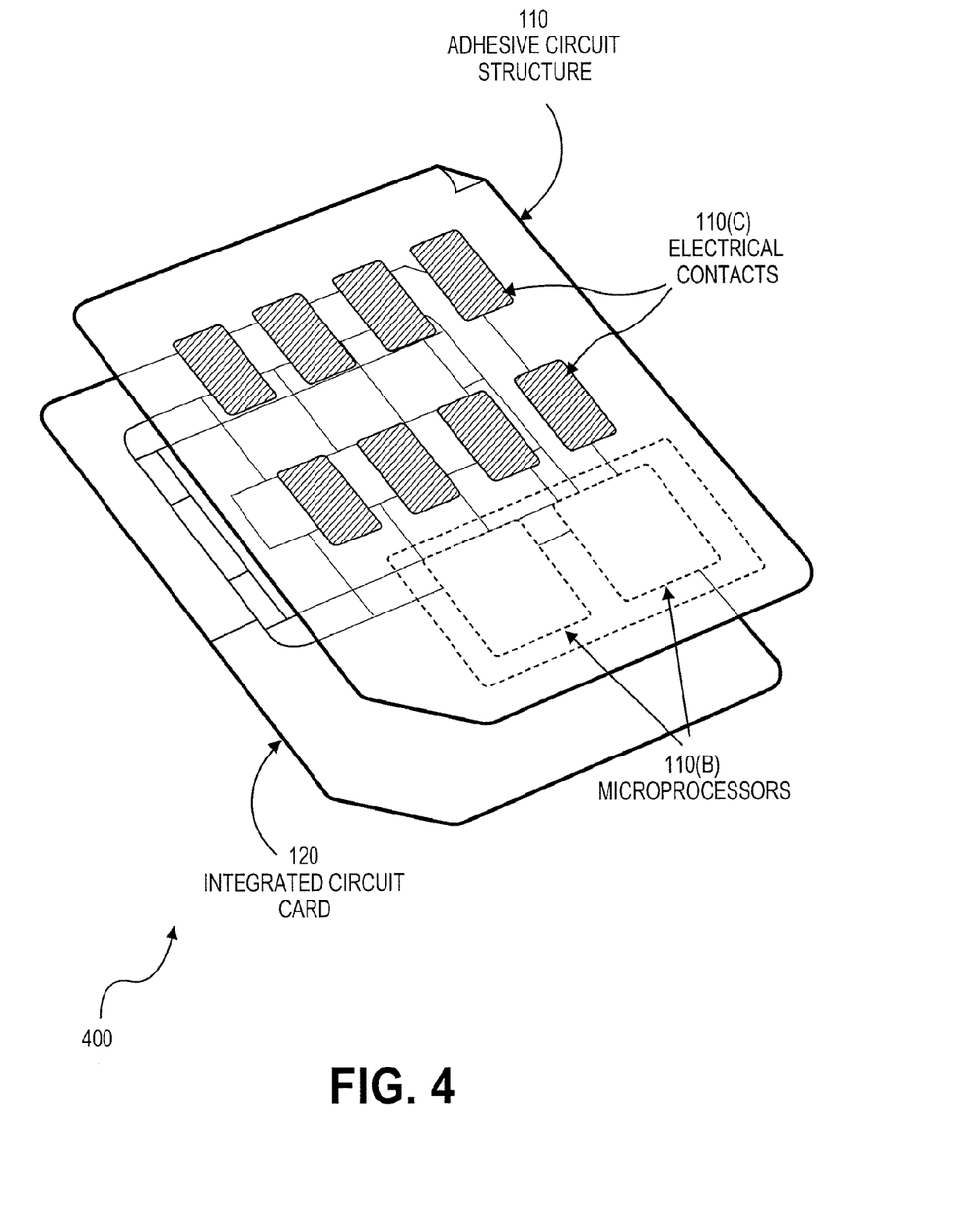
FIG. 4 shows a depiction of an integrated circuit card and an adhesive circuit structure that can be bonded using a placement apparatus according to an embodiment of the invention.

FIG. 4 illustrates an exemplary adhesive circuit structure 110 in the form of a cryptographic expansion device and an integrated circuit card 120 in the form of a SIM card. According to various embodiments, the cryptographic expansion device is a circuit board with integrated circuits implementing a hardware security module (HSM) disposed therein. The cryptographic expansion device can be a flexible printed circuit board in the form of a label. According to the embodiment as shown, the cryptographic expansion device is an adhesive circuit structure 110 with one or more integrated circuits or microprocessors 110(B) and one or more electrical contacts 110(C) disposed therein, and the integrated circuit card 120 that the adhesive circuit structure 110 attaches to is a SIM card (e.g., a mini-SIM card as shown). It should be understood that while the description and explanation provided below are made with reference to a particular embodiment, the description and explanation provided below are applicable to and can be adapted for other embodiments, for example, embodiments in which the cryptographic expansion device is used with a SIM card with a different form factor, or in which the cryptographic expansion device is used with other types of integrated circuit card 120 such as a memory card.

Additional features and specifications regarding an adhesive circuit structure 110 in the form of a cryptographic expansion device can be found in PCT Patent Application No. PCT/US12/47693, titled, "Cryptographic Expansion Device and Related Protocols," which is being filed on the same day as the present application and is herein incorporated by reference in its entirety for all purposes.

II. METHODS

A method according to embodiments of the invention can be described with respect to FIGS. 1-5.

Figure 5:
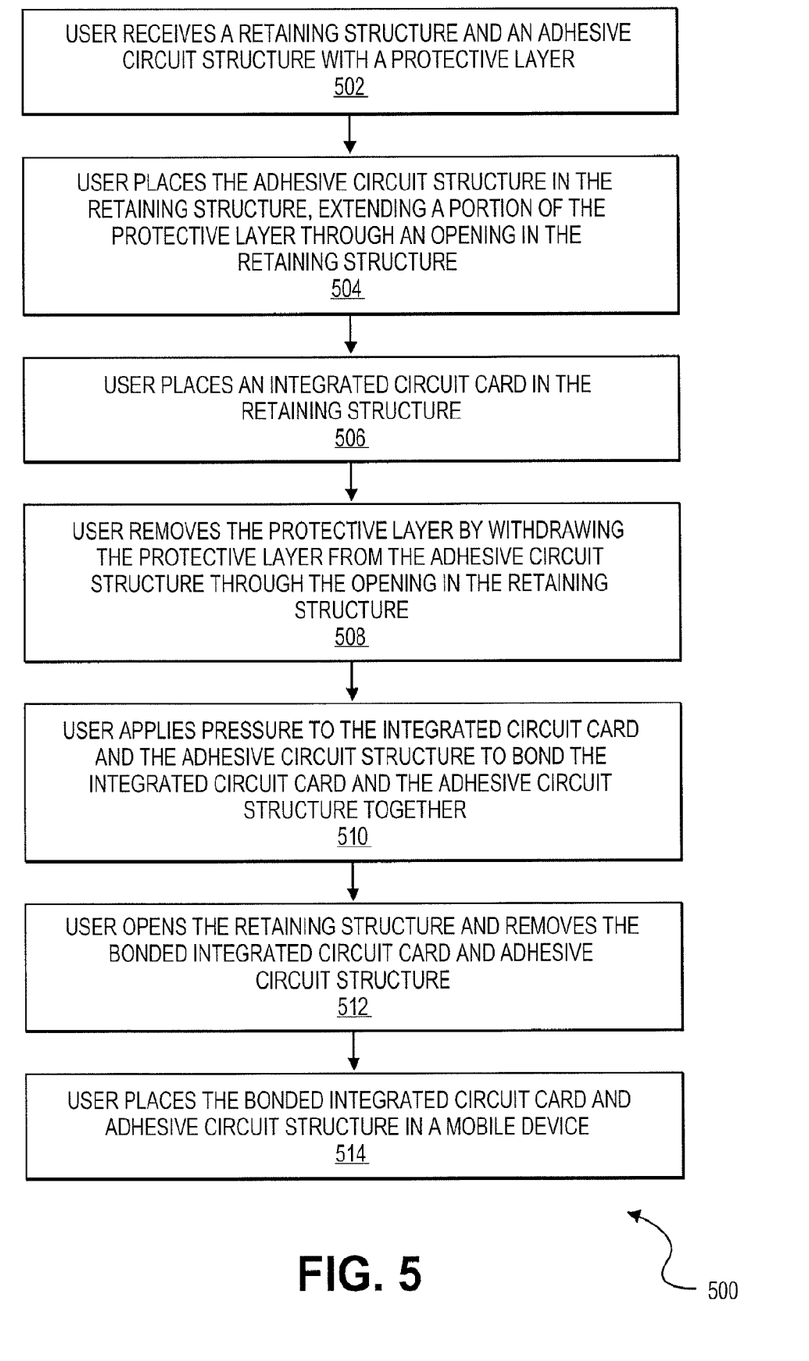
FIG. 5 illustrates a flowchart describing a method of operating a placement apparatus according to an embodiment of the invention.

FIG. 5 is a flowchart of a method 500 for affixing an adhesive circuit structure 105 to an integrated circuit card 120 using a system 100 shown in FIG. 1.

In step 502, user receives a retaining structure (or placement apparatus) 105 and an adhesive circuit structure 110 with a protective layer 115. In some embodiments, the user may receive the retaining structure 105 with the adhesive circuit structure 110 with the protective layer 115 pre-installed in the retaining structure 105. In other embodiments, the user may receive the retaining structure 105 separately from the adhesive circuit structure 110 with the protective layer 115. The retaining structure 105 and the adhesive circuit structure 110 with the protective layer 115 may be provided by a financial institution (e.g. bank) at which the user has a financial account with, or it may be provided by a payment processing network that handles transaction processing for an account associated with the user. The protective layer 115 can protect the adhesive circuit structure 110 from damage or contamination, until the circuit structure is ready to bond to the integrated circuit card 120.

In step 504, user places the adhesive circuit structure 110 in the retaining structure 105, extending a portion 115(c) of the protective layer 115 through an opening 208 in the retaining structure 105. In embodiments of the invention, the adhesive circuit structure 110 will have the same dimensions as the retaining structure 105 in order to ensure accurate and precise placement of the adhesive circuit structure 110 on the integrated circuit card 120. In embodiments where the user receives the retaining structure 105 and the adhesive circuit structure 110 with the protective layer 115 as two separate components, the user will be required to place (or install) the adhesive circuit structure 110 with the protective layer 115 into the retaining structure 105. The user can place the adhesive circuit structure 110 into the retaining structure 105 with the protective layer 115 facing out of the retaining structure 105. The protective layer 115 is comprised of a tab portion 115(C) that is a tab portion length 115(C)-1 longer than the size of the adhesive circuit structure 110. When the user installs the adhesive circuit structure 110 in the retaining structure 105, the user can extend the tab portion 115(C)

of the protective layer 115 through the opening 208 in one of the retaining elements (e.g. walls) of the retaining structure 105.

In step 506, user places an integrated circuit card 120 in the retaining structure 105. Following the placement of the adhesive circuit structure 110 with the protective layer 115 into the retaining structure 105, the user can then place the integrated circuit card 120 in the retaining structure 105. In embodiments, the integrated circuit card 120 may be a subscriber identity module or subscriber identification module (SIM) card from a mobile device (e.g. mobile phone). In embodiments of the invention, the integrated circuit card 120 will have the same dimensions as the retaining structure 105 in order to ensure accurate and precise placement of the adhesive circuit structure 110 on the integrated circuit card 120. In embodiments, the integrated circuit card 120 will be placed into the retaining structure 105 with the side of the integrated circuit card 120 hat is to be adhered to the adhesive circuit structure 110, facing downwards into the retaining structure 105.

In step 508, user removes the protective layer 115 by withdrawing the protective layer 115 from the adhesive circuit structure 110, through the opening 208 in the retaining structure 105. After the user has properly placed the adhesive circuit structure 110 and the integrated circuit card 120 in the retaining structure 105, the user can withdraw the protective layer 115 from the retaining structure 105. In embodiments, the user can pull the tab portion 115(C) of the protective layer 115 through the opening 208 in the retaining structure 105. Once the protective layer 115 is removed from the adhesive circuit structure 110, an adhesive side of the adhesive circuit structure 110 is exposed and ready to be affixed to the integrated circuit card 120.

In step 510, user applies pressure to the integrated circuit card 120 and the adhesive circuit structure 110 to bond the integrated circuit card 120 and the adhesive circuit structure 110 together. After the protective layer 115 has been removed from the adhesive circuit structure 110, the user can apply pressure to the cover portion 204 that is coupled to the retaining portion 202 by the hinge 206. As the user closes the cover portion 204, the protruding portion 210 attached to the underside of the cover portion 204 makes contact with and applies pressure into the integrated circuit card 120. By the user closing and pushing down on the cover portion 204, the protruding portion 210 on the underside of the cover portion 204 correspondingly applies pressure that assists in the bonding process to ensure that the integrated circuit card 120 and the adhesive circuit structure 110 are attached securely and evenly.

In step 512, user opens the retaining structure 105 and removes the bonded integrated circuit card 120 and the adhesive circuit structure 110. In embodiments, once the user has successfully affixed the adhesive circuit structure 110 to the integrated circuit card 120, the user can open the cover portion 204 and can remove the bonded integrated circuit card 120 and the adhesive circuit structure 110 from the retaining structure 105.

In step 514, user places the integrated circuit card 120 and the adhesive circuit structure 110 in a mobile device. In embodiments, the user can then place the bonded integrated circuit card 120 and the adhesive circuit structure 110 in their mobile device to facilitate the functionality of the bonded integrated circuit card 120 and the adhesive circuit structure 110.

III. TECHNICAL BENEFITS

A benefit of embodiments of the invention is the ability to efficiently and accurately affix an adhesive circuit structure to an integrated circuit card which reduces the risk of technical problems and errors. For example, if the adhesive circuit structure and the integrated circuit card are not in alignment when the two components are bonded together via the adhesive material on the adhesive circuit structure, communications using the integrated circuit card may not be properly encrypted. By use of the placement apparatus, these errors can be avoided.

IV. ADDITIONAL EMBODIMENTS

In other embodiments, the configuration of the placement apparatus can vary based upon the form factor of the integrated circuit card. Similarly, the dimensions of the adhesive circuit structure and the protective layer can be based upon the form factor of the integrated circuit card.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

One or more features from any embodiment may be combined with one or more features of any other embodiment without departing from the scope of the disclosure.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An apparatus comprising:
a retaining structure comprising a plurality of retaining elements, the retaining structure cooperatively structured with and configured to receive an integrated circuit card and an adhesive circuit structure comprising a circuit structure and an adhesive on the circuit structure;
an opening in a retaining element in the plurality of retaining elements;
and
a cover portion coupled to the retaining structure, wherein the cover portion comprises a protruding portion that is at an underside of the cover portion and faces inwardly with respect to the retaining structure, the protruding portion configured to apply pressure to attach and bond the adhesive circuit structure to the integrated circuit card.

2. The apparatus of claim 1 wherein the plurality of retaining elements comprises a plurality of walls.

3. The apparatus of claim 1 wherein the integrated circuit card is a SIM card.

4. The apparatus of claim 1 wherein the retaining structure comprises at least four walls, which form the same general shape as a perimeter of the integrated circuit card.

5. The apparatus of claim 1 further comprising a hinge, which couples the cover portion to the retaining structure.

6. The apparatus of claim 1 wherein the opening is horizontally elongated.

7. The apparatus of claim 1 wherein the adhesive circuit structure is a flexible circuit, and wherein the apparatus further comprises a hardware security module (HSM).

8. A system comprising:
an apparatus comprising
a retaining structure comprising a plurality of retaining elements, the retaining structure cooperatively structured with and configured to receive an integrated circuit card and an adhesive circuit structure comprising a circuit structure and an adhesive on the circuit structure, and wherein the integrated circuit card and the adhesive circuit structure are retained by the retaining structure,
an opening in a retaining element in the plurality of retaining elements, and
a cover portion coupled to the retaining structure, wherein the cover portion comprises a protruding portion at an underside of the cover portion and faces inwardly with respect to the retaining structure, the protruding portion configured to apply pressure to attach and bond the adhesive circuit structure to the integrated circuit card;
the integrated circuit card retained by the retaining structure;
the adhesive circuit structure retained by the retaining structure;
and
a protective layer removably attached to the adhesive circuit structure.

9. The system of claim 8 wherein the protective layer has lateral dimensions that are greater than lateral dimensions of the adhesive circuit structure.

10. The system of claim 9 wherein a portion of the protective layer protrudes through the opening.

11. The system of claim 8 wherein the integrated circuit card is a SIM card and the adhesive circuit structure further comprises a hardware security module (HSM).

12. A method comprising:
placing an adhesive circuit structure and a protective layer in a retaining structure comprising a retaining element comprising an opening, the adhesive circuit structure comprising a circuit structure and an adhesive on the circuit structure, wherein a portion of the protective layer passes through the opening;
placing an integrated circuit card in the retaining structure;
separating the protective layer from the adhesive circuit structure by withdrawing the protective layer through the opening; and
applying pressure to the integrated circuit card and the adhesive circuit structure to bond the integrated circuit card and the adhesive circuit structure together using a protruding portion located on a cover portion that is coupled to the retaining structure.

13. The method of claim 12 wherein applying pressure comprises pressing down on the cover portion that is coupled to the retaining structure via a hinge.

14. The method of claim 12 wherein the protective layer comprises a clear plastic film.

15. The method of claim 12 wherein the integrated circuit card is a SIM card and the adhesive circuit structure further comprises a hardware security module (HSM).

16. The method of claim 12 wherein the retaining structure comprises four walls, which are cooperatively structured with respect to a periphery of the integrated circuit card.

* * * * *